(12) United States Patent
Underhill

(10) Patent No.: US 9,605,406 B2
(45) Date of Patent: Mar. 28, 2017

(54) FORWARD ADVANCING LANDSCAPE EDGING APPARATUS

(71) Applicant: Kenneth R. Underhill, Strasburg, PA (US)

(72) Inventor: Kenneth R. Underhill, Strasburg, PA (US)

( * ) Notice: Subject to any disclaimer, the term of this patent is extended or adjusted under 35 U.S.C. 154(b) by 285 days.

(21) Appl. No.: 14/472,051

(22) Filed: Aug. 28, 2014

(65) Prior Publication Data

US 2015/0060094 A1    Mar. 5, 2015

Related U.S. Application Data

(60) Provisional application No. 61/959,839, filed on Sep. 3, 2013.

(51) Int. Cl.
| | |
|---|---|
| *A01G 3/06* | (2006.01) |
| *E02F 5/02* | (2006.01) |
| *A01B 33/00* | (2006.01) |

(52) U.S. Cl.
CPC .............. *E02F 5/022* (2013.01); *A01B 33/00* (2013.01); *A01G 3/062* (2013.01)

(58) Field of Classification Search
CPC ...... A01G 3/062; A01B 33/028; A01B 33/16; A01B 45/00; A01B 33/00; A01D 34/84; E02F 5/022
USPC .................................. 172/15, 17, 41, 42, 43
See application file for complete search history.

(56) References Cited

U.S. PATENT DOCUMENTS

| | | | |
|---|---|---|---|
| 2,555,441 A | 6/1951 | Hackney | |
| 2,718,838 A * | 9/1955 | Schumacher | A01G 3/062 172/16 |
| 2,737,105 A | 3/1956 | Wilson | |
| 2,755,718 A * | 7/1956 | Arndt | A01B 1/065 172/111 |
| 2,847,813 A * | 8/1958 | Hanson, Jr. | A01D 34/84 172/15 |
| 3,192,693 A * | 7/1965 | Bergeson | A01D 43/16 172/13 |
| 3,593,802 A * | 7/1971 | De Lange, Jr. | A01G 3/062 172/111 |
| 3,656,554 A * | 4/1972 | Buhner | A01G 3/062 172/14 |
| 3,852,944 A * | 12/1974 | Zuercher | A01D 34/84 172/14 |
| 4,002,205 A | 1/1977 | Falk | |

(Continued)

*Primary Examiner* — Matthew D Troutman
(74) *Attorney, Agent, or Firm* — Miller Law Group, PLLC

(57) ABSTRACT

An apparatus for cutting an edging trench around a landscape bed is constructed with a cutting blade that is rotated to help move the apparatus in the desired direction of travel while being operated to create an edging trench. The machine can be constructed in self-propelled, non-self-propelled or manually operated stick forms. The apparatus has a cutting blade that is configured in a cone-shaped manner with the narrow diameter located toward the center of the apparatus. The rotor is formed with a pair of thin slicing blades mounted on a spline shaft removable from the apparatus for maintenance. A first slicing blade shears the grass along the top of the trench and forms a vertical wall, while a second slicing blade forms a sloped wall. Displaced soil is discharged from the cutting blade and spread directly over the adjacent landscape bed to eliminate the need for subsequent clean-up operations.

19 Claims, 12 Drawing Sheets

(56) References Cited

U.S. PATENT DOCUMENTS

| | | | | |
|---|---|---|---|---|
| 4,072,195 | A | * | 2/1978 | Carlson ................ A01D 34/84 172/123 |
| 5,156,217 | A | * | 10/1992 | Hirata ................ A01B 33/028 172/15 |
| 5,156,218 | A | | 10/1992 | Metzler |
| 5,226,248 | A | * | 7/1993 | Pollard ................ A01B 45/00 144/334 |
| 5,355,597 | A | | 10/1994 | Pollard |
| 6,092,608 | A | | 7/2000 | Leger |
| 6,289,660 | B1 | * | 9/2001 | Martinez ................ A01D 34/84 56/17.4 |
| 6,302,219 | B1 | * | 10/2001 | Filippini ................ A01B 1/065 172/15 |
| 6,464,015 | B1 | * | 10/2002 | Jones ................ A01B 1/065 172/15 |
| 6,857,481 | B1 | | 2/2005 | Hayes |
| 6,874,581 | B1 | * | 4/2005 | Porter ................ E02F 5/08 172/42 |
| 6,883,616 | B2 | | 4/2005 | Templeton |
| 7,040,448 | B2 | * | 5/2006 | Good ................ A01B 33/028 180/315 |
| 7,096,970 | B1 | | 8/2006 | Porter et al. |
| 7,806,196 | B2 | | 10/2010 | Peterson |
| 7,874,375 | B2 | * | 1/2011 | Pearce ................ A01B 33/028 172/119 |
| 2004/0251037 | A1 | | 12/2004 | Templeton |
| 2006/0011357 | A1 | * | 1/2006 | Casey ................ E02F 5/102 172/16 |
| 2007/0163221 | A1 | * | 7/2007 | Foster ................ A01D 34/84 56/13.7 |
| 2010/0083626 | A1 | * | 4/2010 | Foster ................ A01D 34/84 56/12.7 |
| 2013/0228351 | A1 | * | 9/2013 | Stark ................ A01G 3/062 172/15 |

\* cited by examiner

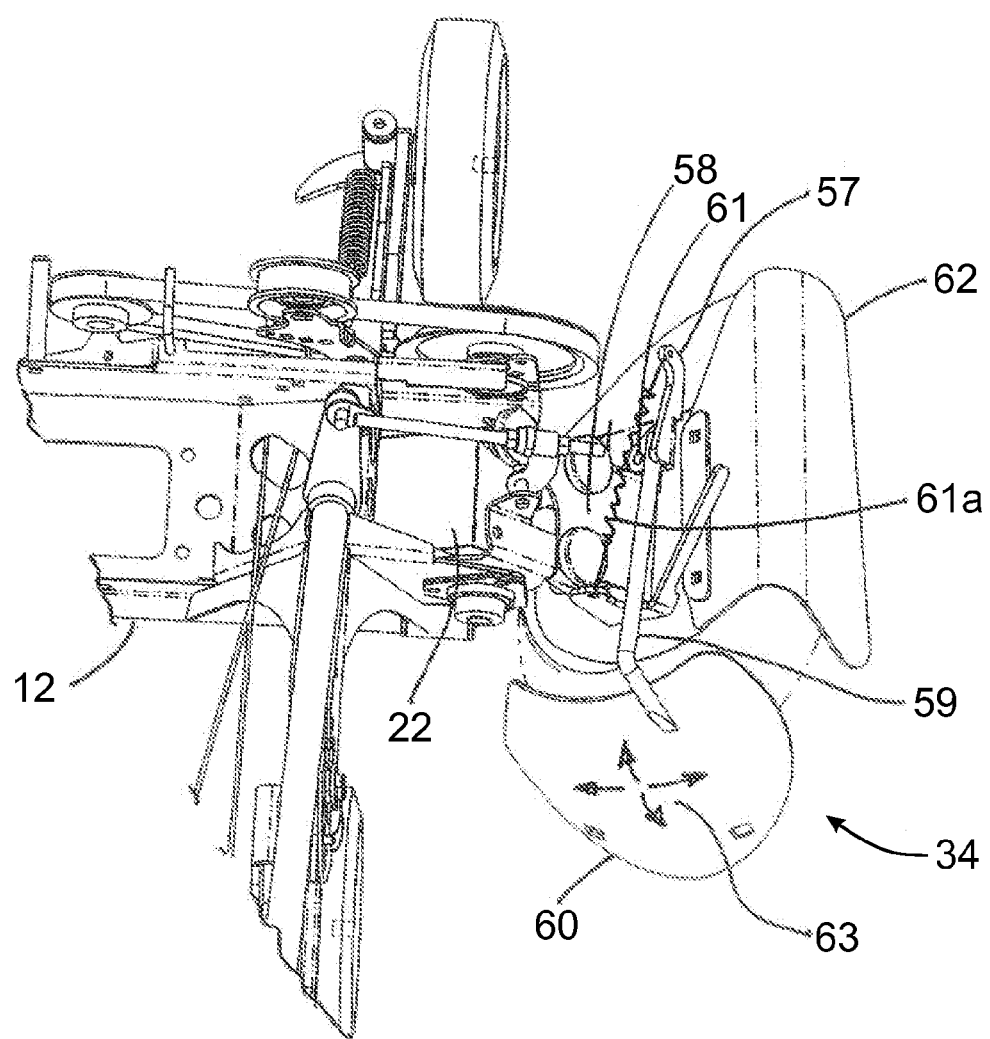
Fig. 3.5

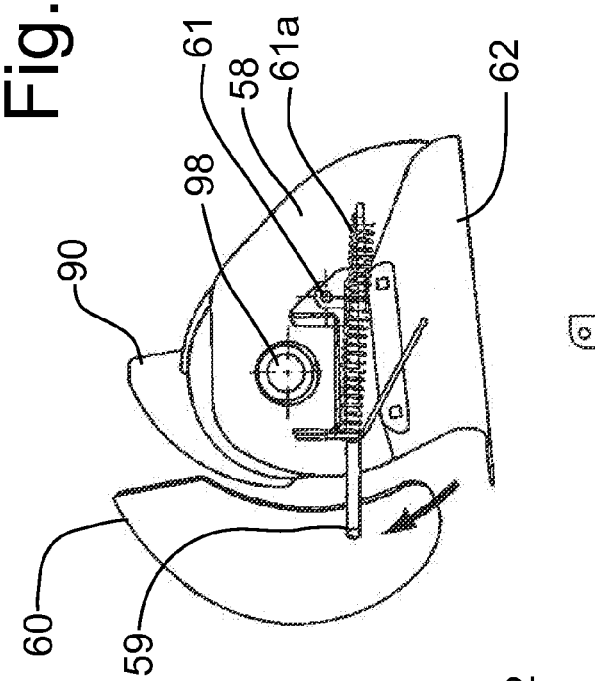
Fig. 3.7
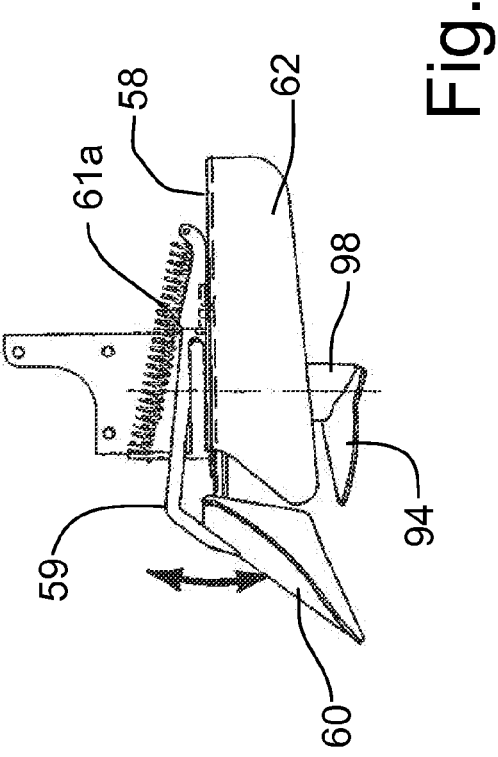
Fig. 3.8
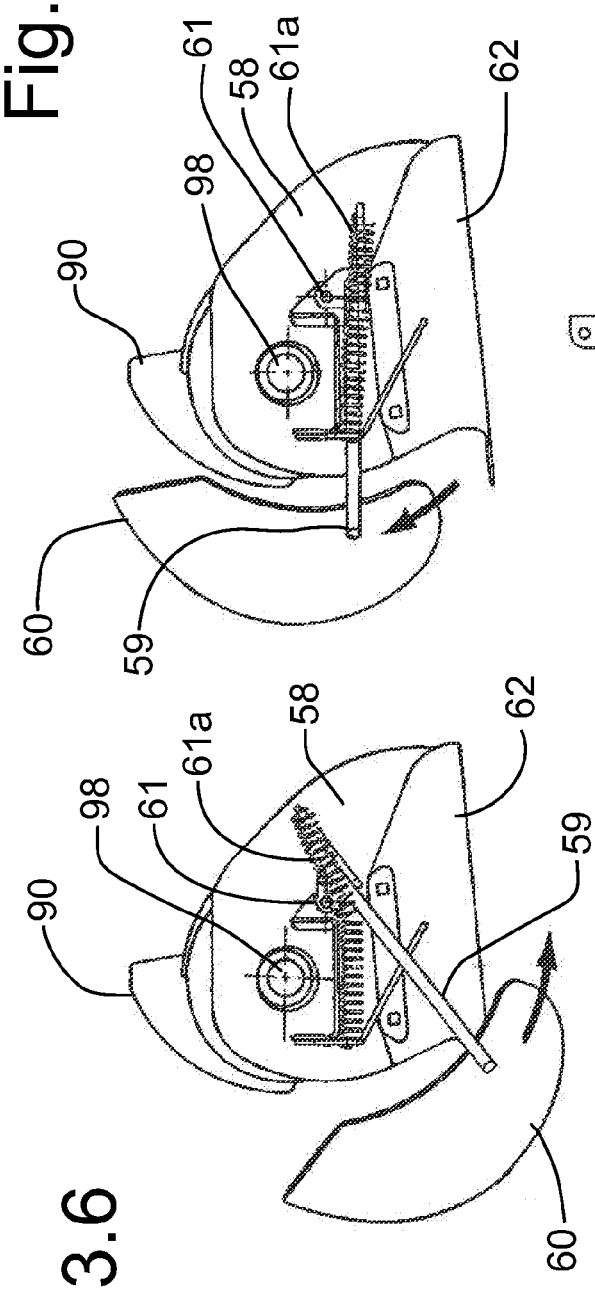
Fig. 3.6

Fig. 5
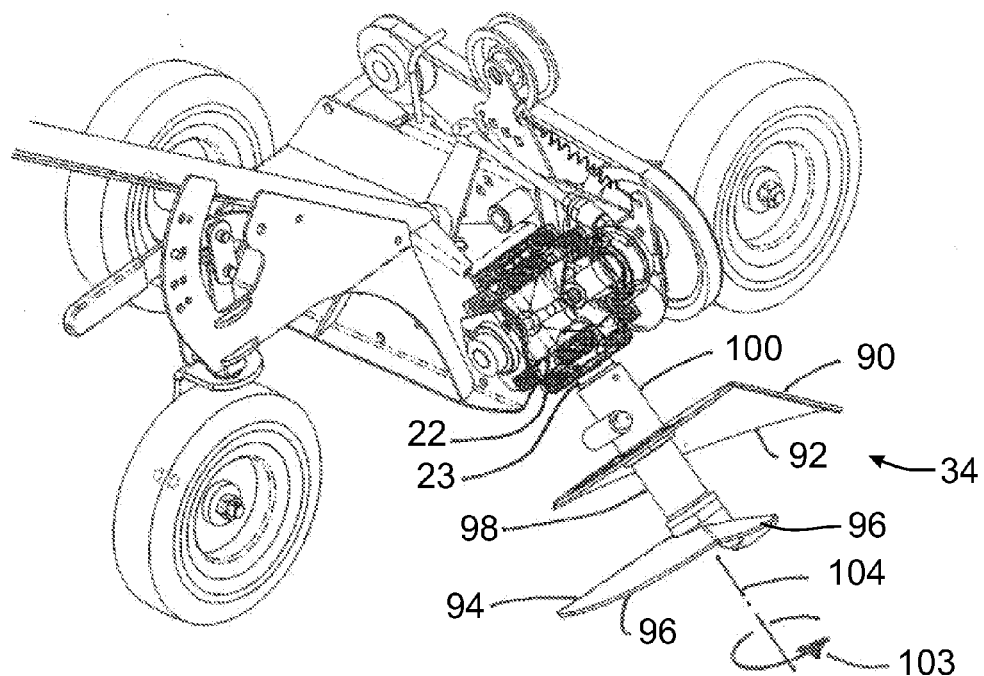
Fig. 6
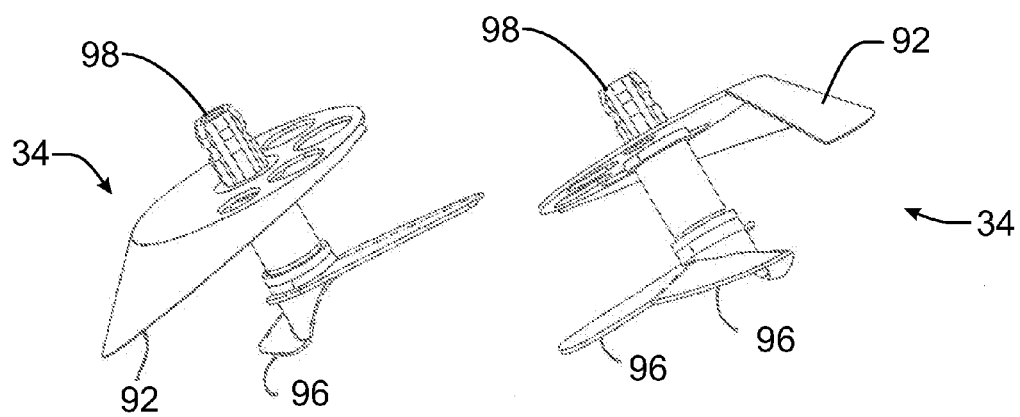
Fig. 7

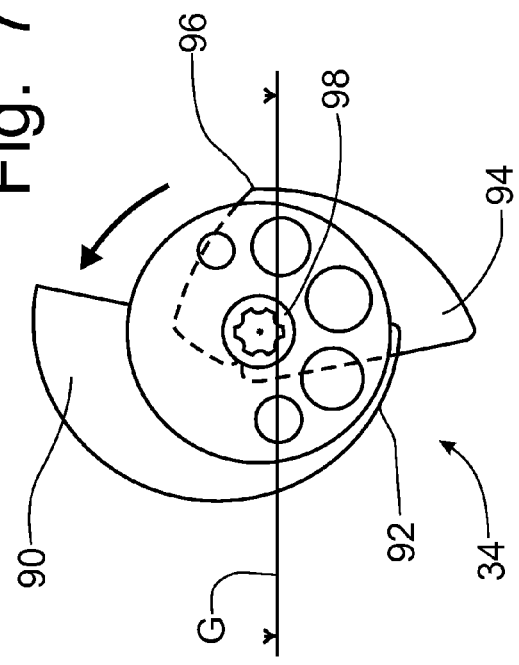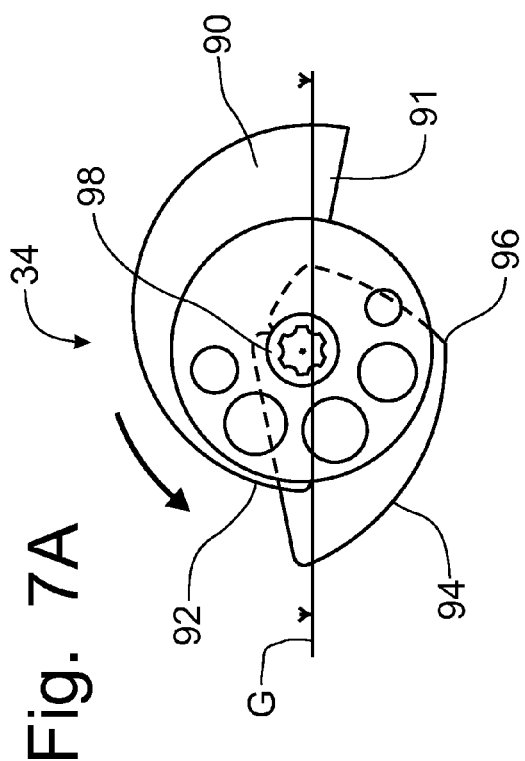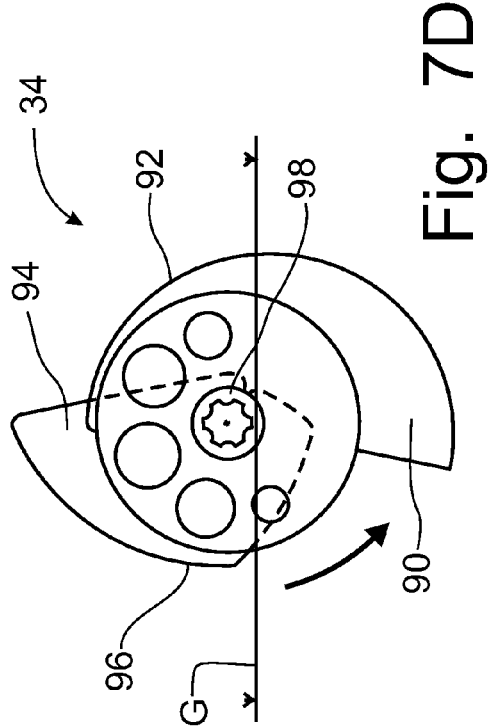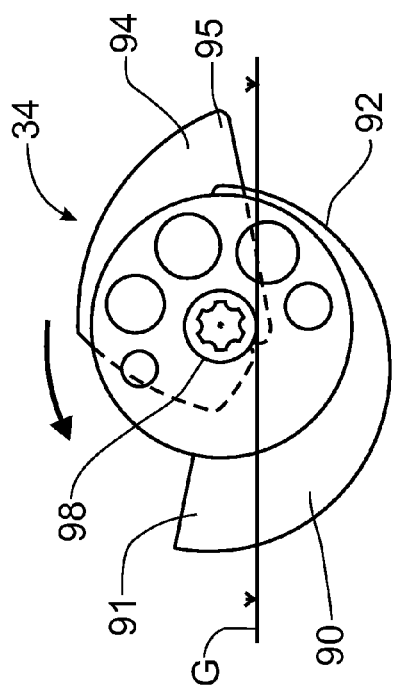

Fig. 14
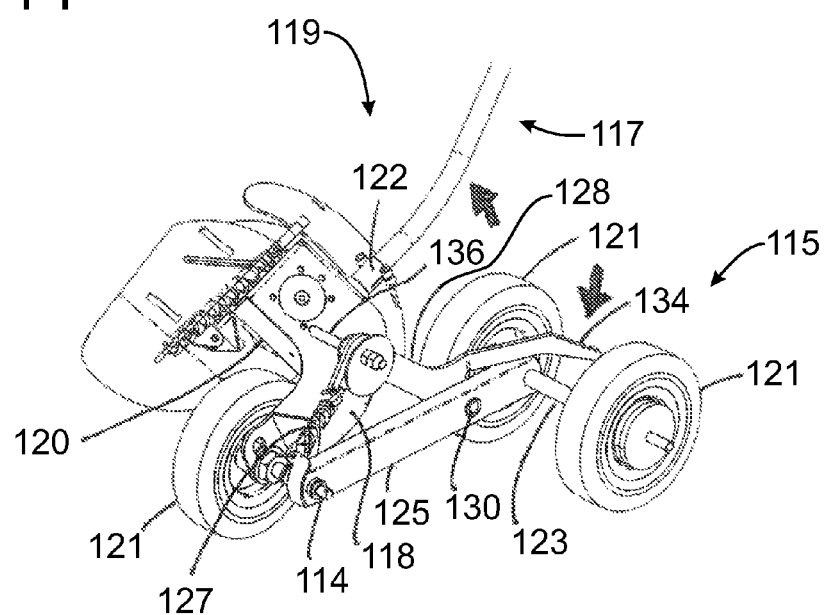
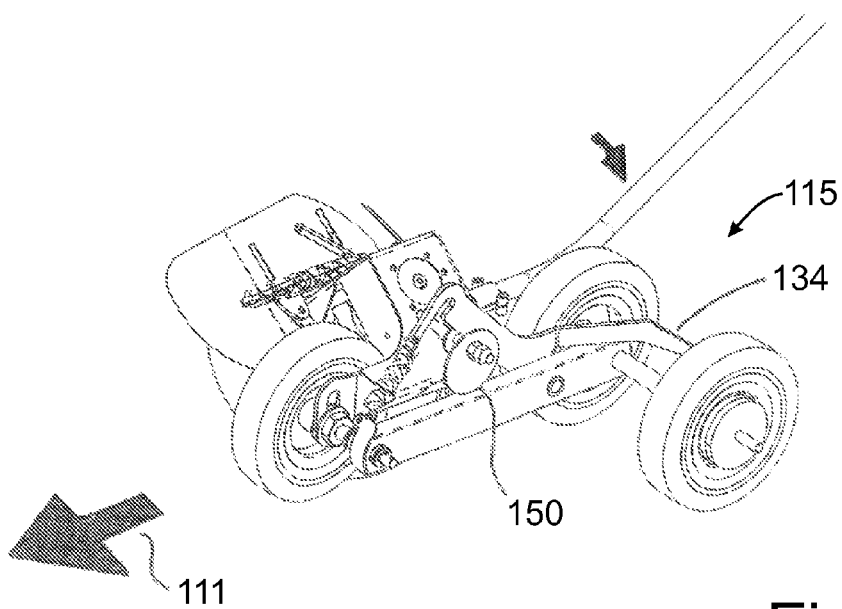
Fig. 15

FORWARD ADVANCING LANDSCAPE EDGING APPARATUS

CROSS-REFERENCE TO RELATED APPLICATIONS

This application claims domestic priority on U.S. Provisional Patent Application Ser. No. 61/959,839, filed on Sep. 3, 2013, the content of which is incorporated herein by reference.

FIELD OF THE INVENTION

This invention relates generally to edging devices used to create an small trench around a landscape bed, and more particularly, to a powered cutting assembly that is used to define the trench as a demarcation between different landscape areas, such as a landscape bed and grass areas, in which the rotation of the powered cutting assembly drives the apparatus forwardly.

BACKGROUND OF THE INVENTION

Edging devices are used to form a trench around the periphery of a landscape area to establish a line of demarcation between the landscape areas. For example, where lawns are adjacent to beds with flowers and/or bushes, and/or surround trees, a distinct dividing line can be formed around the periphery of the bed to create a distinct line of demarcation with respect to the lawn. Commonly, this line is defined by cutting a trench with a vertical wall at the edge of the lawn area. This trench restricts the spreading of grass from the lawn to the adjacent beds and also produces an aesthetically pleasing, sharp, dividing line between the different types of landscape.

The formation of these trenches around the periphery of landscape beds is commonly referred to as edging. Edging has been done in years past with conventional hand tools, such as flat-bladed shovels. While manual formation of trenches is desirable from a standpoint of flexibility and control, forming the trenches manually is labor intensive, requiring at least one worker slowly forming the trench. Thus, the manual formation of the landscape edging has a number of drawbacks. The slow manual formation of the edging trench typically requires the investment of many man hours, which typically dictates the need for a large work crew. This manual formation of the edging trench can be onerous when the work crew encounters dry and hard ground conditions, leading to significant worker fatigue. Furthermore, the manual formation of the edging trench usually results is an overall ragged appearance that does not precisely follow an intended course due to the incremental formation of the trench. Also, workers must deal with the material removed during trench formation. In a typical formation using a shovel, large chunks of terrain may be separated. These chunks either have to be hauled away or broken up manually to be distributed back into the bed.

As is shown in U.S. Pat. No. 2,555,441, granted on Jun. 5, 1951, to James G. Hackney, and in U.S. Pat. No. 2,737,105, granted on Mar. 6, 1956, to Aaron Wilson, edgers with powered rotating cutting assemblies have been developed for use in the landscaping industry to replace the manual process of forming edging trenches. Some edger cutting systems, such as disclosed in U.S. Pat. No. 6,857,481, issued to Johnny Hayes on Feb. 22, 2005, and in U.S. Pat. No. 6,092,608, granted on Jul. 25, 2000, to Herbert J. Leger, have a rotary, generally flat disc-shaped blade that penetrates the ground to produce an edging trench with spaced vertical walls. Such an edging device will cut large chunks of terrain that have to be either hauled away or broken up to be distributed back into the landscape bed.

In U.S. Pat. No. 4,002,205 issued on Jan. 11, 1977, to David C. Falk, and in U.S. Pat. No. 5,355,597, issued to Charles H. Pollard on Oct. 18, 1994, the powered trench cutting system is provided with a welded cutting member that includes a series of teeth strategically disposed to cooperatively produce a beveled or v-shaped trench. The toothed trench-forming blade in U.S. Patent Publication No. 2004/0251037 of David J. Templeton, published on Dec. 16, 2004, pulverizes the terrain that is removed from forming the trench and piles the removed terrain along the side of the trench to be manually distributed back into the bed without the need to be hauled away.

Both powered cutting systems have a frame structure with one or more wheels that facilitate controlled repositioning the edging apparatus over an adjacent surface of the ground. The operator can either manually pull the less expensive non-self-propelled version of the edging machine backwards along the periphery of the landscape bed to form the edging trench or the operator can walk forwardly when operating a more expensive self-propelled configuration of the edging machine, such as is disclosed in U.S. Pat. No. 5,156,218, granted to Dennis E. Metzler, et al, on Oct. 20, 1992.

While both of these types of powered cutting edgers overcome problems associated with manual trenching, the use of such powered edging devices also has some limitations and drawbacks.

First of all, the pull-backward edging machines, such as is disclosed in U.S. Pat. No. 7,096,970, granted on Aug. 29, 2006, to Roger D. Porter, et al, require the operator to pull the machine rearward, which is opposite to the direction that the blade rotation is trying to push the machine as the trench is being formed. Fighting the rotation of the cutting assembly causes premature operator fatigue. A similar problem is associated with the forward operating self-propelled machine, such as is disclosed in U.S. Pat. No. 6,883,616, issued on Apr. 26, 2005, to David J. Templeton, as this machine also has a cutting blade that pushes the machine in the opposite direction that the drive mechanism for the machine is moving the machine, thereby wasting engine power with opposing forces fighting against each other.

Both self-propelled and non-self-propelled trench forming machines are typically heavy implements, weighing between 125 and 400 pounds, which can cause transportation problems, particularly for rental centers, as the implement would require two or more people to lift the implement. These machines have a cutting system that utilizes multiple tooth blunt cutting blades to form the trench. When these blunt cutting blades encounter hard soil, tree roots and rocks, the rotation of the cutting system tends to raise the machine which tends to make the machine buck and jump relative to the ground. The solution to this problem is to make the machine heavy enough to keep the machine under control. Furthermore, these blunt tooth cutting systems have a cutting geometry that doesn't allow the cutter to slide up and over obstructions, as the teeth bite into the obstruction which magnifies the bucking and jumping problem.

Additional problems associated with the conventional powered edging machines is that for the non-self-propelled version, the machine is difficult to operate as the machine has to be pulled rearwardly forcing the operator to look rearwardly in order to walk, while being required to look forwardly to observe the machine cutting the edging trench. Accordingly, the non-self-propelled machine is uncomfortable and non-intuitive to operate. In the conventional powered cutting system, the throw path geometry of the pulverizing cutting blade soil distribution system throws the displaced terrain upwardly from the blade into engagement with a deflecting shield that first deflects the soil laterally and then deflects the soil downwardly to pile the soil along the side of the edging trench being formed. This displaced soil will need to be hand raked and spread out into the landscape bed, or alternatively removed, which requires an additional manual operation.

The problem of bucking a jumping of the machine when encountering obstacles is worse when the trench forming machine is pushed forwardly instead of being pulled backwardly. The operator can quickly lose control of the conventional trench forming machine when pushing in the same direction that the blunt cutting teeth of the rotor are pushing. Accordingly, the operator will have difficulty reacting quickly enough to change direction of the movement of the machine when an obstacle is encountered by the blunt teeth. By the time the operator realized an obstacle has been encountered, the trench forming machine has already thrust forwardly and possibly bucked sideways, thereby cutting in an unintended trench cutting path. Therefore, pulling conventional trench forming machine rearwardly puts the operator in a better position to react and maintain control of the operation of the machine since the operator is pulling the edger rearwardly.

Another problem associated with conventional powered trench cutting systems is the throw path geometry for the displaced soil from the edging trench. This pulverizing cutting blade soil distribution system does not deflect all of the displaced soil onto the bed adjacent the trench being formed. During the movement of the displaced, pulverized soil upwardly from the cutting blade, some of the soil will deflect out of the soil deflecting structure and land on the grass side of the trench. The unintentional displacement of the soil landing on the uncut grass terrain gives an unfinished look to the edging trench, which again requires re-distribution (clean-up) by hand-raking it over the edging trench and into the landscape bed through an additional manual operation.

The displaced soil throw path geometry of the pulverizing cutting blade soil distribution system on conventional powered cutting systems can have difficulty operating properly in wet soil conditions. Wet soil may cling and build up to the deflecting shields to a point of plugging the soil distribution throw path. When the throw path is plugged, the wet soil will build-up on the deflecting shields, which will then release as clumps of soil that later have to be broken up, then raked by hand into the bed in an additional operation. Alternatively, the wet soil will eventually accumulate on the deflecting shield to a point the deflecting shield completely plugs the machine, preventing any cut soil from being distributed from the cutting blade, which results in stoppage of the edging operation.

Conventional powered cutting systems, such as disclosed in U.S. Pat. No. 7,806,196, granted to Brent Peterson on Oct. 5, 2010, utilize blunt cutting teeth that pound the ground to penetrate, and then bulldozes through the terrain to displace soil and form the edging trench. Cutting an edging trench in such a blunt force operation requires excessive engine power, which is particularly onerous when the ground conditions are dry and hard. Furthermore, this blunt force type of cutting system also demands a heavy duty, and thus more expensive, drive mechanism to power the cutting blade. In addition, this blunt force trench cutting system requires the cutting blades to be disposed in a manner to produce a beveled or V-shaped edging trench. The blunt cutting teeth catch on every rock and tree root that might lie under the surface of the ground where the edging trench is to be formed. When the blunt cutting teeth hit on such obstructions, the teeth try to cut through the obstruction (possibly damaging the tree roots), but there is a tendency for the edger to "jump" randomly from the terrain during operation, potentially causing damage to the machine, injury to the operator, and imprecise trench formation, or at a minimum slow or even stop the edging operation.

The formation of a beveled or V-shaped edging trench requires the conventional powered trench cutting systems to orient the axis of rotation of the cutting implement somewhat parallel to the terrain surface. In some topographical circumstances, orienting the axis of rotation parallel to the ground results in a long reach for the extended cutting teeth to reach the surface of the ground past the bearing support structure, and then penetrate the cut distance into the terrain to reach the desired trench depth. The further the cutting teeth are from the bearing support, the longer the moment arm distance is away from the axis of rotation of cutting implement, which results in requiring more torque/power to form the edging trench.

Furthermore, the large soil deflecting structure needed for the conventional powered trench cutting systems to try to control the displacement of the soil from the edging trench being formed restricts the view of the operator and limits the ability of the operator to place the formation of the edging trench at exactly the location desired. Although the large soil deflecting shield is needed on conventional machines to deflect the displaced soil onto the bed adjacent the edging trench being formed and to prevent injury to the operator and others from flying debris, the large box shape of the soil deflecting shield is completely encloses the cutting blade system, which doesn't allow the operator good visibility to see where the blade is cutting the terrain.

Accordingly, it would be desirable to provide an apparatus for cutting an edging trench around landscape beds that had an improved system for displacing soil from the trench onto the ground adjacent the formed trench. It would also be desirable to provide a trench forming apparatus in which the cutting member was rotated in a direction that would facilitate the movement of the apparatus over the surface of the ground during operation in forming the edging trench.

SUMMARY OF THE INVENTION

It is an object of this invention to overcome the disadvantages of the prior art lawn edging machines by providing a terrain cutting system that has lower weight and a lower cost to manufacture, does not fatigue the operator during operation, cuts edging trenches using less energy, allows forward moving operation without the need of a self-propelled transmission, automatically and evenly spreads and distributes displaced soil to the bed without needing a second operation to clean the trench or spread the cut soil into the bed, does not damage tree roots and does not plug when cutting wet terrain.

It is a feature of this invention that the direction of rotation of the cutting blade assists the operator to push the machine forwardly. The edging trench forming machine according to the principles of this invention has the cutting blade rotating counter clockwise, when viewed from the center of the machine out. Rotating the cutting member in this direction helps to propel the machine forwardly during operation, greatly reducing the force required by the operator to push a non-self-propelled machine, sometimes to a point of having to hold the machine back.

It is another feature of this invention that the lower machine weight makes the trench-forming machine easier to lift, transport and operate.

It is another object of this invention to provide a powered rotating cutting member for an edging trench forming machine in which the rotation of the cutting member helps to propel the machine forward.

It is another feature of this invention to provide a cone-shaped cutting blade profile. The 360 degree cutting blade profile is cone shaped having a small diameter at one end and the larger diameter at the other. The small diameter end of the cone is toward the center of the machine. When the gearbox output shaft axis is horizontal or higher, the smaller diameter end of the cone is pointing either horizontally or somewhat toward the ground. At these angles, the cutting blade is normally in an inactive transport position. When output shaft axis is horizontal or lower with the larger diameter end of the cone pointing more toward the ground, the cutting blade is normally in an operating/working position.

It is an advantage of this invention that the edger apparatus has a high torque cutting geometry. When the gearbox pivots down to its working position, the rotary blade cutting circumference of the cone is theoretically cutting the more vertical surface of the V-shaped edging trench. The further the cutter pivots down the more vertical the circumference profile surface becomes. The geometry of having the cutting blade cone axis of rotation pointing downwardly and the blade circumference profile surface cutting the most vertical wall of the trench creates a much shorter cut moment arm to the rotary blade shaft axis. The result is angling the cutter axis downwardly to permit the use of a smaller diameter cutting cone profile as compared to current commercially available bededgers that use a horizontal axis in both operating and working positions. The smaller the blade cone diameter, the less torque/power required to cut the edging trench.

It is still another object of this invention to provide a forward operating direction control. When the cutter blade is in the operating position, straight forward machine movement is best controlled when the center point of the rotational axis at the larger diameter end of the cutting cone is located close to the ground surface. The deeper the center point goes below the ground surface, the more the contact with the ground wraps around the cutter cone circumference profile and changes the push geometry of the cutter blade away from just straight forward movement to pushing straight and sideways angling the directing of the machine.

It is another advantage of this invention that the edger apparatus doesn't plug or clump the soil cut from the trench formed by the edger apparatus. The displaced soil throw geometry is a very short throw distance with basically a straight path from the cutter blade to the bed. Centrifugal force moves the displaced soil away from the cutter along the inside of the trench cleaning plate, which wraps mostly around the cutter without any harsh deflecting turns, thus eliminating the potential of plugging or clumping the soil. The cutter blade evenly releases and spreads the soil directly into the bed without the need for a second operation to spread the soil over the landscape bed.

It is yet another object of this invention to provide a method of forming a clean trench and for spreading the displaced soil generated therefrom. To prevent the displaced soil from being thrown back into and re-filling the trench, the trench cleaning plate contains the cut soil close to the cutter circumference until it's at the right position for release to be thrown out and spread onto the bed. The way the cone shaped cutter blade enters the terrain and disburses the soil in cooperation with the tapered shaped trench cleaning blade that's partly positioned above and down in the trench does not allow any soil from getting on the grass side of the edging trench.

It is still another feature of this invention that the edger apparatus can include stacked replaceable cutting teeth. The bededging cutter blades can thus be individually replaceable, which are loosely stacked on a spline shaft for easy assembly and quick low cost maintenance for replacing worn-out teeth. Alternatively, the bededging cutter blades can be formed as a single weldment that provides cost savings for manufacturing, while allowing replacement of the cutting teeth.

It is yet another feature of this invention to provide a grass and soil slicing blade as part of the rotor assembly. The grass slicing blade is located at the small diameter end of the cutting cone profile and consistently and cleanly cuts the grass and root zone along the upper vertical edge of the edging trench. The slicing blade is a disc with a cutting side wall flange that angles down the outer surface of the cone profile surface. The side wall length is very short at the end that first engages the grass extending in length to the trailing end. This tapered cutting/slicing edge should be thin or even sharp to improve its grass cutting performance. The rotational geometry of the grass slicing blade slices into the ground using the uncut ground itself as a shear bar to cleanly cut the grass leaving a sharp edge to the vertical wall of the trench with a clean cut appearance to the grass at the top corner of the trench.

It is still another feature of this invention to provide a root protection blade. The cutting blade pulverizes the soil but rises up and over tree roots with minimal damage to the tree root. As described above, the tapered cutting/slicing edge cuts the soil and grass, but can't cut through solid objects like tree roots and just simply slides over them, which also helps to protect the drive line components of the machine.

It is yet another advantage of this invention that the edger apparatus can be utilized as a walk-behind unit. The walk-behind frame has a handle bar dashboard control mechanism that has an extended arm linked to the pivoting gearbox mounted on the lower frame for control of the position of the cutter from an inactive transport position to sidewalk edging and trench cutting positions.

It is a further object of this invention that the edger apparatus can be configured as a "stick" cutter assembly that pivots about a wheel axle raising the cutter assemble vertically up to transport position or down to operating position.

It is a further feature of this invention that the "stick" cutter embodiment of the invention utilizes a two axle frame using both axles in operating mode and the rear axle only to transport when the machine is not operating.

It is a further advantage of this invention to provide a trench forming apparatus that achieves control of a forward operating machine.

It is still a further feature of this invention that the cutting system utilizes long tapered cutting surfaces with at least one open area for each of the slicing blades to permit the slicing blades to gradually slice into the terrain to form the trench.

It is still a further advantage of this invention that the thin slicing blades do not generate as much rotor traction as conventional blunt tooth cutting systems during operation, thus allowing greater control over the operation of the trench forming machine.

It is yet a further advantage of this invention that the control over the operation of the trench forming machine does not require the addition of weight to the machine.

These and other objects, features and advantages are accomplished according to the instant invention by providing an apparatus for cutting an edging trench around a landscape bed is constructed with a cutting blade that is rotated to help move the apparatus in the desired direction of travel while being operated to create an edging trench. The machine can be constructed in self-propelled, non-self-propelled or manually operated stick forms. The apparatus has a cutting blade that is configured in a cone-shaped manner with the narrow diameter located toward the center of the apparatus. The rotor is formed with a pair of thin slicing blades mounted on a spline shaft removable from the apparatus for maintenance. A first slicing blade shears the grass along the top of the trench and forms a vertical wall, while a second slicing blade forms a sloped wall. Displaced soil is discharged from the cutting blade and spread directly over the adjacent landscape bed to eliminate the need for subsequent clean-up operations.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3.5 is an enlarged partial upper, rear perspective view of the pivoting control panel moved into the inoperative transport position, the engine and other components being removed for purposes of clarity;

FIG. 3.6 is a top plan view of the rotor shield assembly and the trench cleaning plate and associated mechanism taken in alignment with the axis of rotation of the rotor assembly, the trench cleaning plate being shown in a raised position above the surface of the ground;

FIG. 3.7 is a top plan view of the rotor shield assembly and the trench cleaning plate similar to that of FIG. 3.6, but with the trench cleaning plate being shown in an operative lowered position within the trench being formed by the rotor assembly;

FIG. 3.8 is an orthogonal view relative to the view of FIG. 3.7, showing the trench cleaning plate in the operative lowered position rearwardly of the rotor assembly;

FIG. 5 is a partial right, rear perspective view of the pivoting control panel moved into the operative, trench forming position, the engine and other components being removed for purposes of clarity;

FIGS. 6 and 7 are perspective views of the rotor assembly;

FIGS. 7A-7D are schematic sectional views of the rotor looking outwardly toward the distal end of the rotor to show the operation of the slicing blades of the rotor in a sequential manner with each of FIGS. 7A through 7D representing approximately a 90 degree rotation relative to the preceding view;

FIG. 14 is a partial left front perspective view of the second embodiment of the edger apparatus with the rotor assembly raised into the inoperative transport position; and FIG. 15 is a partial left front perspective view of the second embodiment of the edger apparatus as seen in FIG. 14, but with the rotor assembly lowered into the operative trench forming position.

DETAILED DESCRIPTION OF THE PREFERRED EMBODIMENTS

Referring now to drawings and particularly to FIGS. 1-10, a first embodiment of an edging trench forming apparatus incorporating the principles of the instant invention can best be seen. Any references to left and right or front and rear are used as a matter of convenience and are determined by standing at the rear of the apparatus with the terrain slicing rotor 34 forming the edging trench positioned forwardly and along the right side of the machine.

Figure 1:
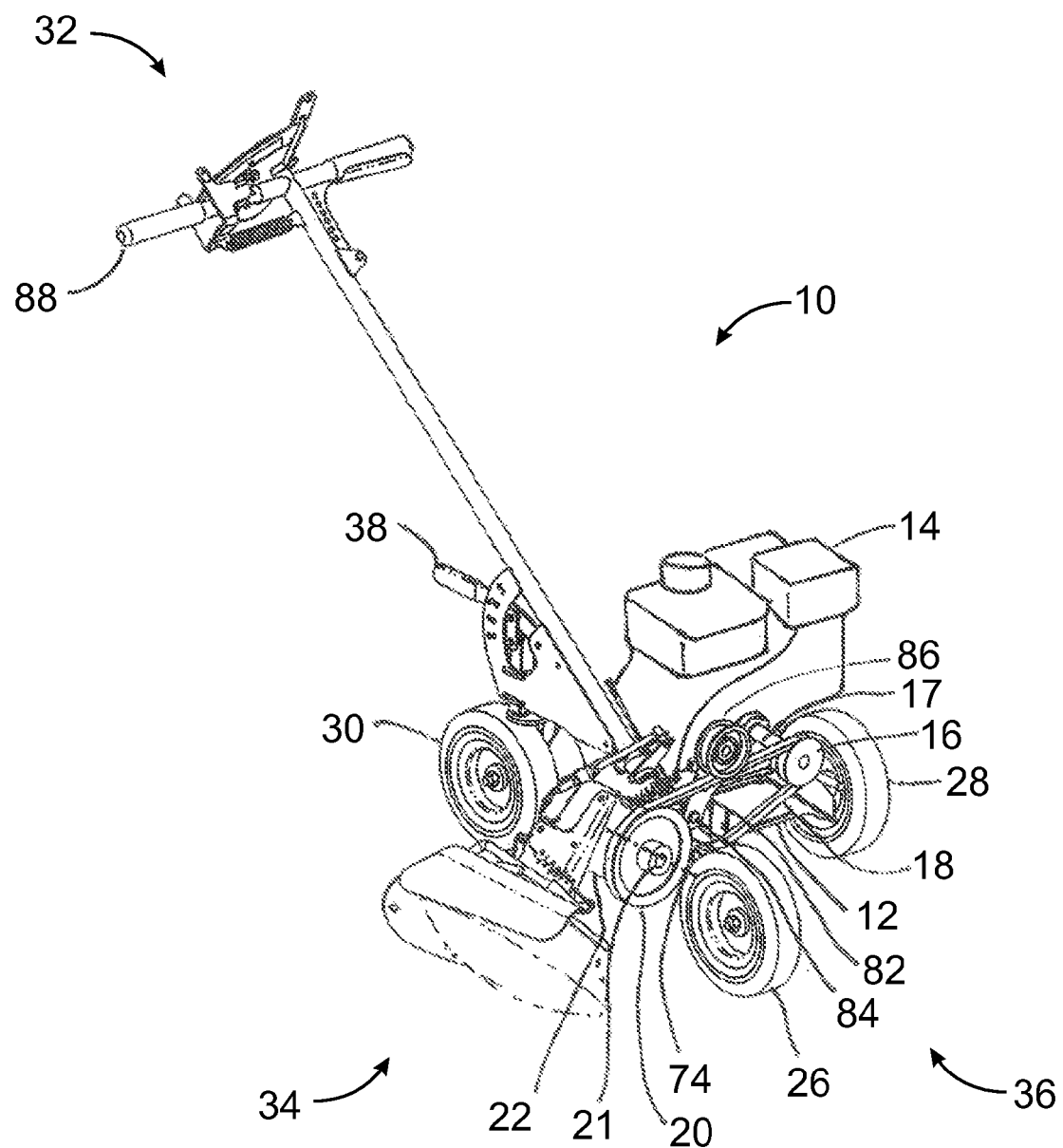
FIG. 1 is a right, front perspective view of the edger apparatus with the rotor assembly lowered into an operative position.

FIG. 1 shows a perspective view of the gearbox pivot drop edger 10 (also referred to as the walk-behind bed edging machine) that consists of a main frame 12 that can be advanced controllably relative to subjacent terrain. The main frame 12 is preferably provided with three wheels, including two fixed wheels 26, 28 and a pivoting caster wheel 30 located rearwardly of the two fixed wheels 26, 28. To create a zero turn steering the fixed front wheel 26 carries the least amount of weight to allow it to easily slide sideways when turning but still have enough weight to steer the edger in a straight line forward when desired to facilitate controlled repositioning. Caster wheel 30 and fixed wheel 26 have depth control mechanisms rear 38 and front 36 that raise or lower the right side of main frame 12 and terrain slicing rotor 34 to achieve the desired trench cutting depth.

Engine 14 is mounted to main frame 12 and has engine drive sheave 16 attached to engine 14 power take-off shaft 17. Engine drive sheave 16 transmits power through drive v-belt 18 to gearbox sheave 20 which is attached to the gearbox input shaft 21 of gearbox 22. Gearbox 22 transmits power from its rotating input shaft 21 to its rotating output shaft 23, best seen in FIG. 5, to the terrain rotor slicing rotor assembly 34. Gearbox 22 is pivotally mounted to main frame 12 on the gearbox input shaft 21 axis 74. The operator can control the position to which the gearbox 22 is pivoted from the handle bar assembly 32 by manipulation of the control panel 40, as will be described in greater detail below. The pivoting of the gearbox 22 controls the positioning of the terrain slicing rotor assembly 34 that is attached to the output shaft 23 of gearbox 22.

Figure 2:
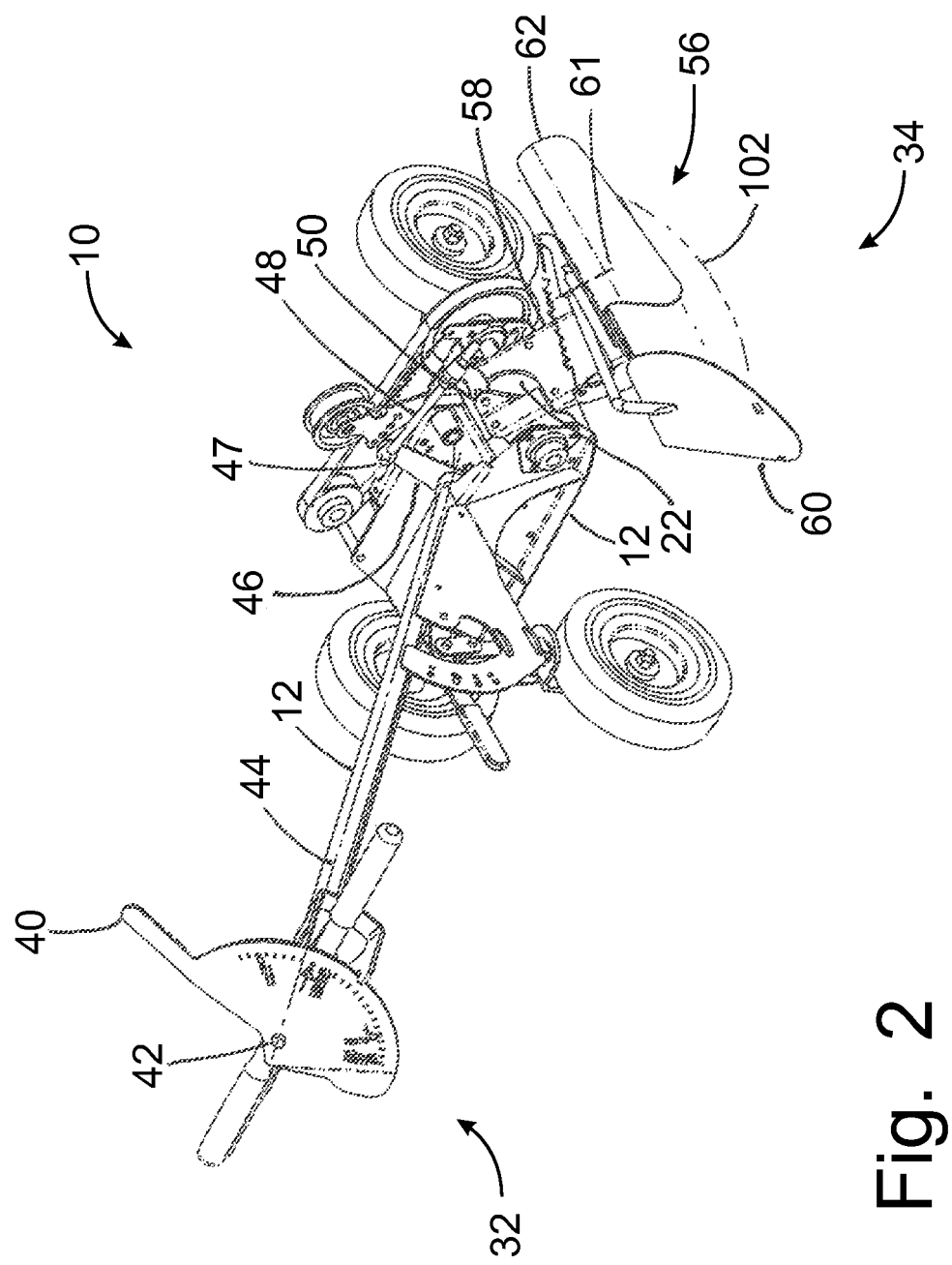
FIG. 2 is a right, rear perspective view of the edger apparatus shown in FIG. 1 with the engine being removed for purposes of clarity.

FIG. 2 is a right, rear perspective view of the edger 10 without the engine being shown. A control panel 40 is mounted on the handle bar assembly 32, attached to the upper end of shaft 42 that pivots on the tube axis 44 of the main frame 12. A pivot arm 46 is attached to the lower end of shaft 42 to transfer pivotal movement of the shaft 42 through a link 48 which interconnects the pivot arm 46 at location 47 and the gearbox extension arm 50 to affect pivoting and positioning of the gearbox 22 and the rotating terrain slicing rotor 34 between an inactive transport position 54, depicted in FIG. 4, and an active terrain trench cutting position 52, depicted in FIG. 3. The terrain slicing rotor 34 consists of a slicing rotor blade assembly 56 having a 360 degree cone shaped cutting pattern 102 and being attached to the gearbox output shaft 23, as best seen in FIG. 5. A rotor shield assembly 58 is attached to the gearbox 22, with a trench cleaning plate 60 being pivotally attached to rotor shield assembly 58. A flexible soil deflection flap 62 is also mounted to rotor shield assembly 58 to deflect displaced soil onto the landscape bed.

Figure 4:
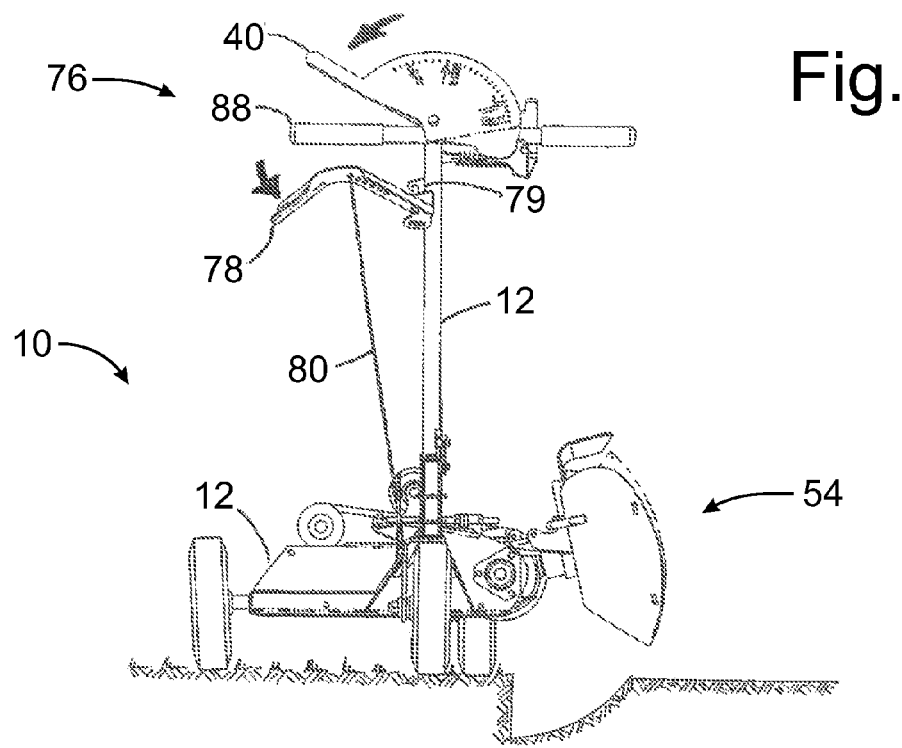
FIG. 4 is a rear elevational view of the edger apparatus similar to that shown in FIG. 3, but with the rotor assembly raised into an inoperative transport position, a representative trench formed by the rotor assembly being shown below the raised rotor assembly.
Figure 3:
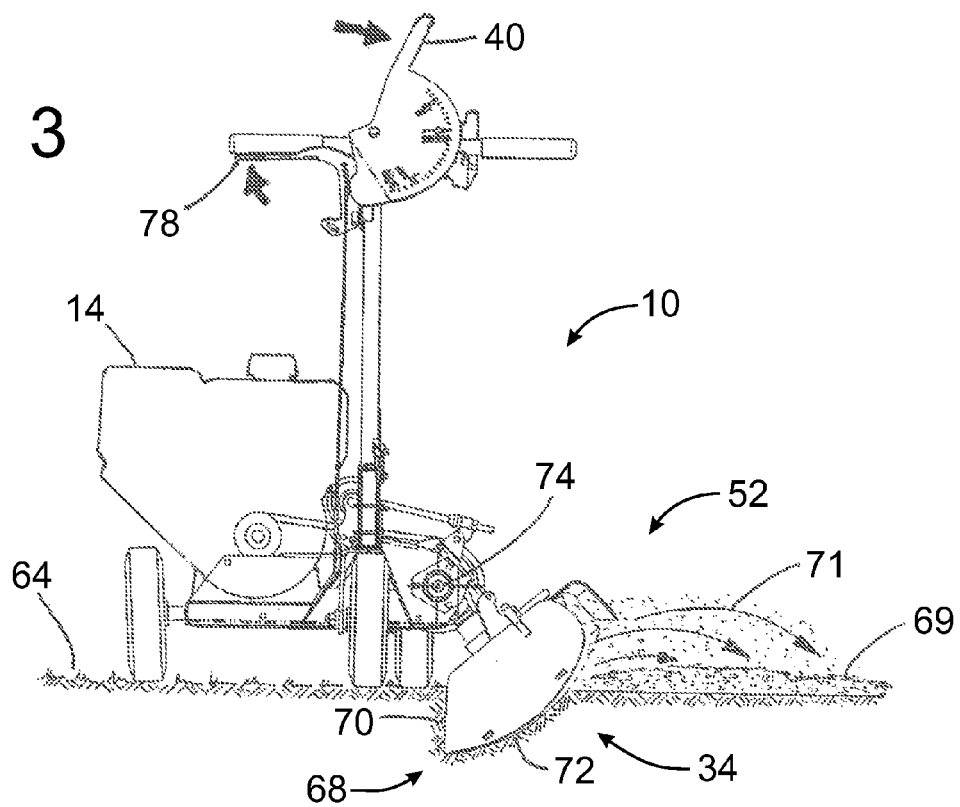
FIG. 3 is a rear elevational view of the edger apparatus with the rotor assembly lowered into an operative position, a representative discharge of material from the trench being formed by the rotor assembly being shown.

FIG. 3 is a rear view showing the terrain slicing rotor assembly 34 lowered into the terrain 64 in the active terrain trench cutting position 52. As a result of the configuration of the terrain slicing rotor assembly 34, the trench 68 is somewhat V-shaped having a vertical wall 70 and a slanted wall 72. The slanted wall 72 has a curved shape due to the terrain slicing rotor 34 pivoting path in and out of the terrain brought about by pivoting on the gearbox 22 input shaft on axis 74. The curved shape of the slanted wall 72 allows the terrain slicing rotor 34 to easily pivot up to inactive transport position 54, as shown in FIG. 4, without trying to cut through terrain, which would be the case if the slanted wall 72 were straight. Arrows 71 show the discharge path of the cut or displaced soil when thrown from terrain slicing rotor 34 and landing in the bed 69.

FIG. 3.5 is an enlarged perspective view of main frame 12 with terrain slicing rotor assembly 34 attached to gearbox 22. The trench cleaning plate 60 is pivotally attached to a trench soil deflector pin 61, which is attached to rotor shield assembly 58. The connection between the trench cleaning plate 60 through the deflector pin 61 is loose, which allows a multi-directional movement of the trench cleaning plate 60 as shown by arrows 63. The multi-directional movement of trench cleaning plate 60 allows the trench cleaning plate 60 to follow and float on the ever changing trench surface, particularly changes in the vertical depth of the formed trench.

Referring now to FIGS. 3.5, 3.6, 3.7 and 3.8, the trench cleaning plate 60 can best be seen. The purpose of the trench cleaning plate 60 is to trail behind the rotor 34 within the formed trench so that displaced soil is not conveyed from the rotor 34 rearwardly into the trench that has just been formed, and thus filling the formed trench. With the trench cleaning plate 60 positioned in the formed trench immediately behind the rotor 34, the displaced soil is deflected out of the trench and unto the landscape bed. The trench cleaning plate 60 is connected by a spring 61a that biases the trench cleaning plate 60 into the formed trench. Because of the irregularities of a formed trench, particularly due to encountering obstacles, such as roots and rocks, the trench cleaning plate 60 needs to be able to move both laterally and vertically to maintain position within the formed trench. The biasing spring 61a and the loose connection of the trench cleaning plate by the pivot pin 61 permits this floating movement.

Preferably, the spring 61a is oriented such that the line of the spring 61a extends slightly upwardly as the spring 61a extends rearwardly, best seen in the side elevational view of FIG. 3.8, and also slightly inwardly toward the machine as the spring 61a extends rearwardly, as best seen in the top plan view of FIG. 3.7. The orientation of the spring 61a relative to the loose fitting deflector pivot pin 61 is such that the positioning of the trench cleaning plate 60 on top of the ground at the beginning of the operation of the edger 10 positions the line of the spring 61a next to the pin 61, as best seen in FIG. 3.6, so that the moment arm of the spring force exerted by the spring 61a is small when the trench cleaning plate 60 is out of the ground, but spaced further away from the pin 61 when the trench cleaning plate 60 is positioned within the formed trench, as shown in FIG. 3.7.

Therefore, when the edger 10 is initiating the trench-forming operation, the rotor 34 and the trench cleaning plate 60 are located on the top surface of the ground in the orientation shown in FIG. 3.7. As the rotor 34 moves into the ground to form the trench, the trench-cleaning plate 60 remains on the surface of the ground, deflecting upwardly as the rotor 34 digs into the ground until the first part of the trench is formed and the rotor 34 and trench cleaning plate 60 or in the orientation shown in FIG. 3.6. The deflection of the trench cleaning plate 60 stretches the spring 61a and, as a result, increases the spring force exerted thereby. However, since the moment arm for the spring force decreases, the actual force exerted on the trench cleaning plate 60 does not increase, which enables the trench cleaning plate 60 to ease into the trench as the rotor 34 progresses forwardly in the formation of the trench. The net result is that the biasing spring 61a does not exert a large force on the trench cleaning plate 60 when the trench cleaning plate 60 is deflected to be positioned on the surface ground when the rotor 34 is in the trench, thus facilitating the movement of the trench cleaning plate into the trench even though a large spring force is being exerted on the trench cleaning plate 60.

FIG. 4 shows a control panel 40 pivoted to a transport position and a clutch handle assembly 76 shown in a declutch position disengaging rotary power from the engine 14 to the terrain slicing rotor 34. The clutch handle assembly 76 consists of a clutch pivot arm 78 pivotally attached to main frame 12 at location 79, which is operable to translate pivot motion thereof through the link 80 to pivot an idler arm 82, best seen in FIG. 1, which is pivotally attached to the main frame 12 at pivot location 84. The idler sheave 86 is attached to the pivot idler arm 82. When the clutch pivot arm 78 is pivoted upward to the handle bar 88, as shown in FIG. 1, the idler sheave 86 pivots down into engagement with the drive v-belt 18, tightening the v-belt 18 around engine drive sheave 16 and thereby allowing rotational power from the engine 14 to be transmitted through the v-belt 18 to drive the rotation of the terrain slicing rotor 34.

FIG. 5 is an enlarged perspective view without the engine 14, rotor shield assembly 58 and trench cleaning plate 60. FIG. 6 and FIG. 7 are opposing perspective views of the terrain slicing rotor 34 with the 360 degree cone shaped cut pattern 102 removed to better view the details of the rotor 34. The terrain slicing rotor 34 is formed with a first slicing blade 90 that upon rotation forms the vertical wall of the trench with the slice cutting edge 92. A second slicing blade 94 is located at the distal end of the rotor 34 and forms upon rotation the slanted wall of the trench with the slice cutting edge 96. Both of the first and second slicing blades 90, 94 are attached to the rotor shaft 98 so as to be rotatable therewith. The terrain slicing rotor 34 is slideably attached to the gearbox output drive shaft 23 through the connecting hub 100 to permit the rotor 34 to be removed for service or replacement.

The operation of the rotor 34 is reflected in the cross-sectional views 7A-7D taken parallel to, or along the line of, the axis of rotation of the rotor 34. As can be seen in FIGS. 7A through 7C, the first slicing blade 90 first engages the surface of the ground G with the cutting edge 92 in a slicing or scissors action that increases the depth of the first slicing blade 90 into the ground as the rotor 34 rotates. After about 360 degrees of rotation, as shown in FIG. 7A, the trailing end 91 of the first slicing blade 90 exits the ground G as the forward cutting edge 92 starts to engage the ground G. The trailing edge 95 of the second slicing blade 94 exits the ground G, as seen in FIG. 7C at about the same time as the trailing end 91 of the first slicing blade 90 enters the ground G. The forward edge 96 of the second slicing blade 94 engages the ground G with a similar slicing or scissors-like action, as seen in FIG. 7D, that increases in depth as the rotor 34 rotates, as seen in FIG. 7A until the trailing edge 95 of the second slicing blade 94 exits the ground, as depicted in FIG. 7C.

As a result, a balanced cutting action is accomplished by the rotor 34, reducing the power required to form the trench. With each rotation of the rotor 34, a portion of the vertical wall 70 of the trench 68 is formed by the first slicing blade 90 followed by the formation of a portion of the sloped face 72 of the trench 68 by the second slicing blade 94. With each slicing blade 90, 94 engaging the ground in a slicing manner resulting in a progressively increasing depth of the slicing blade 90, 94 into the ground, less power is required than in the conventional trench forming machines that impact the ground with brute force.

One skilled in the art will recognize that the thin slicing blades 90, 94 do not bluntly impact the ground, as is known in conventional prior art edging machines, but instead slice into the ground with a tapered cutting edge 92, 96 that minimizes the amount of force required to form the trench. Since the first and second slicing blades 90, 94 are relatively thin, i.e. preferably less than a quarter of an inch thick, and are substantially continuously engaged in the ground with first one slicing blade 90, 94 and then the other slicing blade 90, 94, the amount of horsepower required to rotate the rotor 34 and form the trench is substantially less than has been conventionally known in the art. As noted elsewhere within this specification, the rotation of the first slicing blade 90 forms the vertical wall of the formed trench, while the second slicing blade 94 forms the slanted or curved wall of the formed trench.

Furthermore, the operation of the thin slicing blades 90, 94 keeps the edging machine 10 from jumping when hitting an obstacle in the ground while the rotor is forming the trench. The thin slicing blades 90, 94 will slide upwardly over the obstacle, slightly raising the edging machine 10, until the obstacle has been cleared, as opposed to conventional edging machine bluntly pounding the obstacle with brute force, which tends to make conventional edging machines jump vertically, depending on the weight of the edging machine. Accordingly, the instant edging machine 10 does not require a large mass to keep the machine 10 stable.

Figure 9:
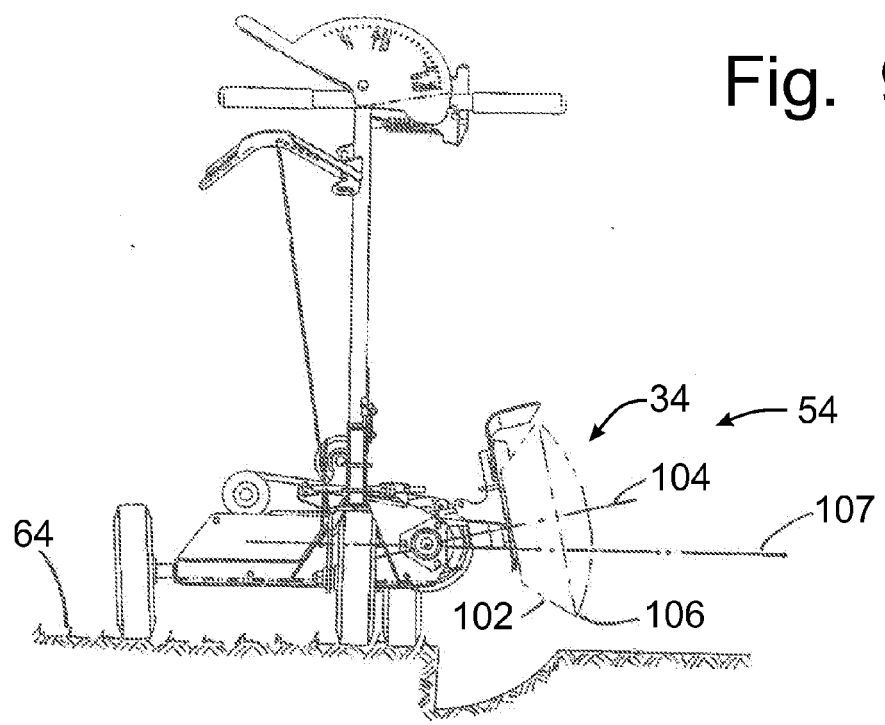
FIG. 9 is a rear elevational view of the edger apparatus as shown in FIG. 8, but with the rotor assembly raised into the inoperative transport position.
Figure 8:
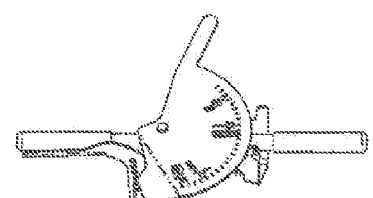
FIG. 8 is rear elevational view of the edger apparatus with the rotor assembly lowered into the trench forming operative position, the engine being removed for purposes of clarity.
Figure 8:
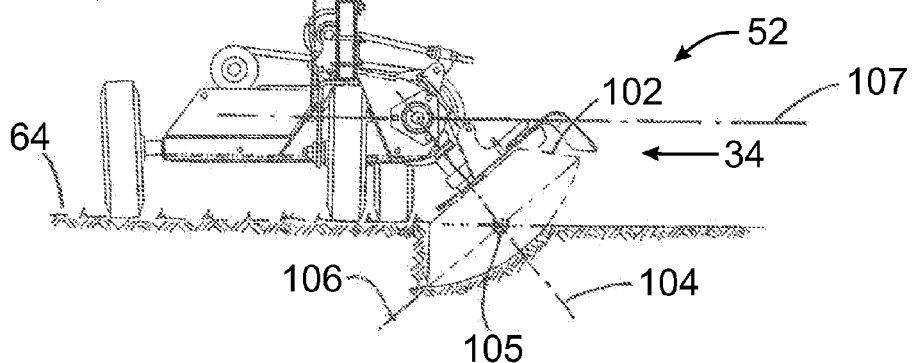

Referring now to FIGS. 8 and 9, the movement of the terrain slicing rotor 34 between the raised inoperative transport and the lowered trench forming positions can best be seen. Both FIGS. 8 and 9 depict a rear view of the edger 10 with the engine 14 and trench cleaning plate 60 removed for purposes of clarity. The terrain slicing rotor 34 is lowered into active terrain trench cutting position 52 in FIG. 8 and raised into the inactive transport position in FIG. 9. During rotation, the terrain slicing rotor 34 forms a 360 degree cone shaped cutting pattern 102, the rotor 34 rotating counter clockwise, as shown by the arrow 103 in FIG. 5, when viewing outwardly from the center of the machine toward the distal end of the rotor 34. The cone shaped cutting pattern 102 has a smaller diameter cone end positioned closer to the gearbox 126 and a larger diameter cone end positioned further away from the gearbox 126.

When the axis 104 of the output shaft 23 is oriented horizontally, as depicted in FIGS. 8 and 9 by the center line 107, or is angled below horizontal, the largest diameter portion of the cone shaped cutting pattern 102 is positioned close to or located in the terrain and the rotor 34 is considered to be in an operating/working position. Point 105 is defined as being located at the intersection of the section plane 106 of the cone shaped cutting pattern 102 and the axis 104. When the terrain slicing rotor 34 is at full cutting depth, the terrain slicing rotor 34 is positioned with intersection point 105 on or slightly above the top surface of terrain 64 at location 105. If the terrain slicing rotor 34 is positioned with the intersection point 105 below the top surface of the terrain 64, the rotary cutting forces created by the terrain slicing rotor 34 engaging with the terrain start to steer the machine 10 more to the side instead of moving straight ahead. Conversely, FIG. 9 shows the edger 10 with the axis 104 of the gearbox output shaft 23 is oriented horizontally, or angled higher than horizontal 107, to position the rotor 34 in an inactive transport position 54.

Figure 10:
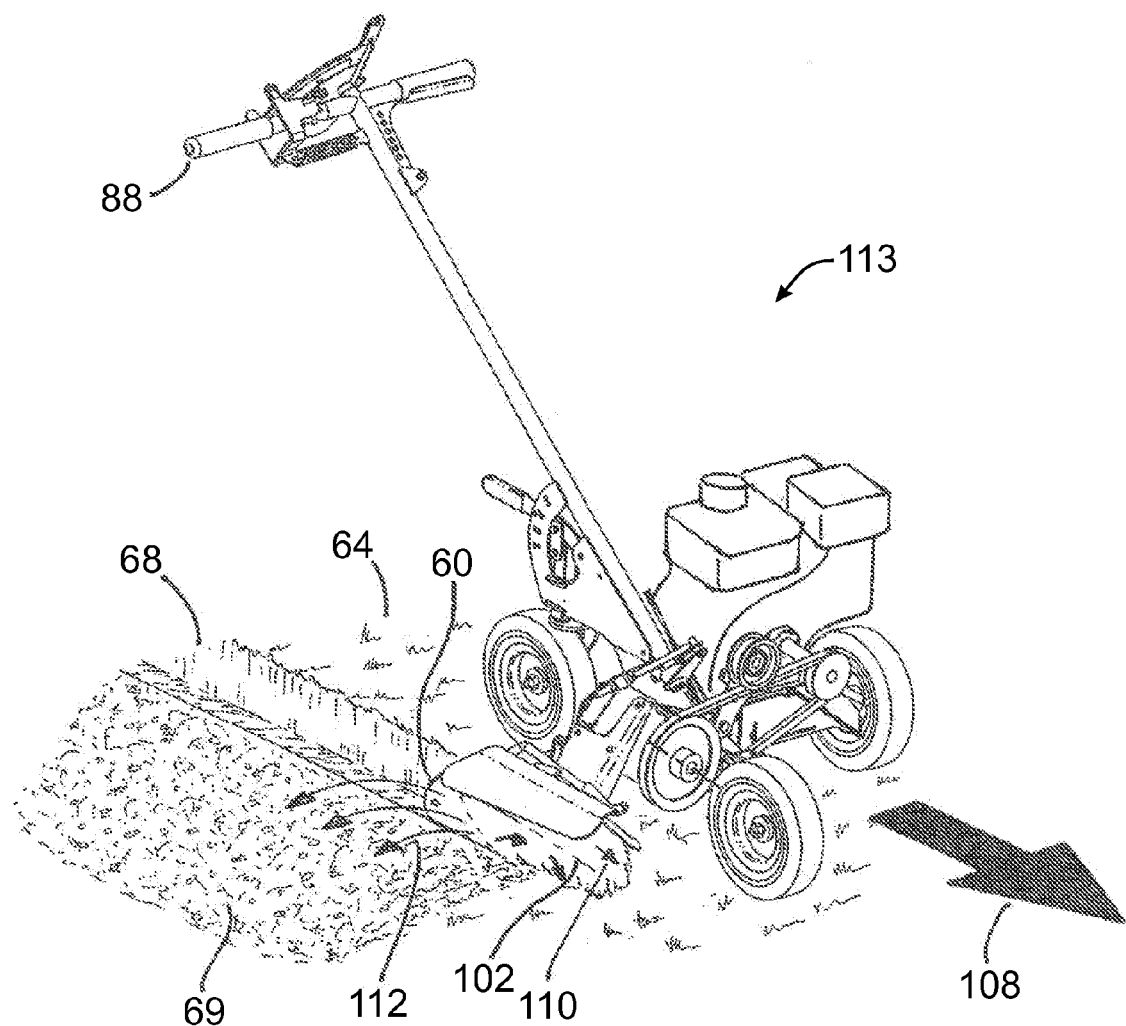
FIG. 10 is a right front perspective view of the edger apparatus in operation to form a trench with the displaced soil being spread over the adjacent landscape bed.
Figure 11:
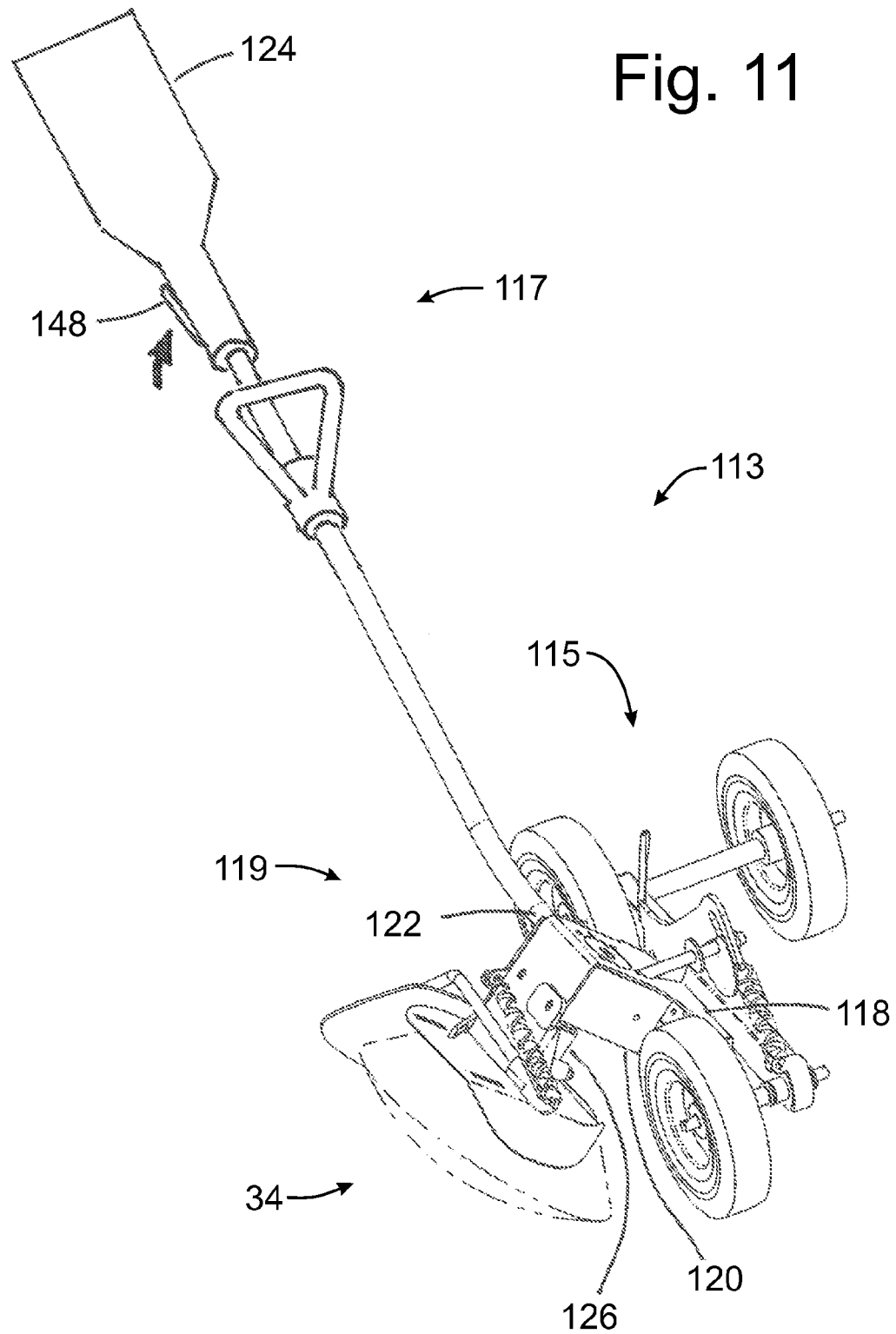
FIG. 11 is a right front perspective view of a second embodiment of the edger apparatus, the rotor assembly being raised into an inoperative transport position.

The operation of the edger can be seen in FIG. 10, traveling forward as shown by direction arrow 108. Direction arrow 110 shows the counter clockwise rotation direction of the 360 degree cone shaped cut pattern 102 of the terrain slicing rotor 34. Arrow 112 depicts the movement of the displaced soil being thrown out and away from the terrain slicing rotor 34 and the trench cleaning plate 60 into the landscape bed 69.

Figure 12:
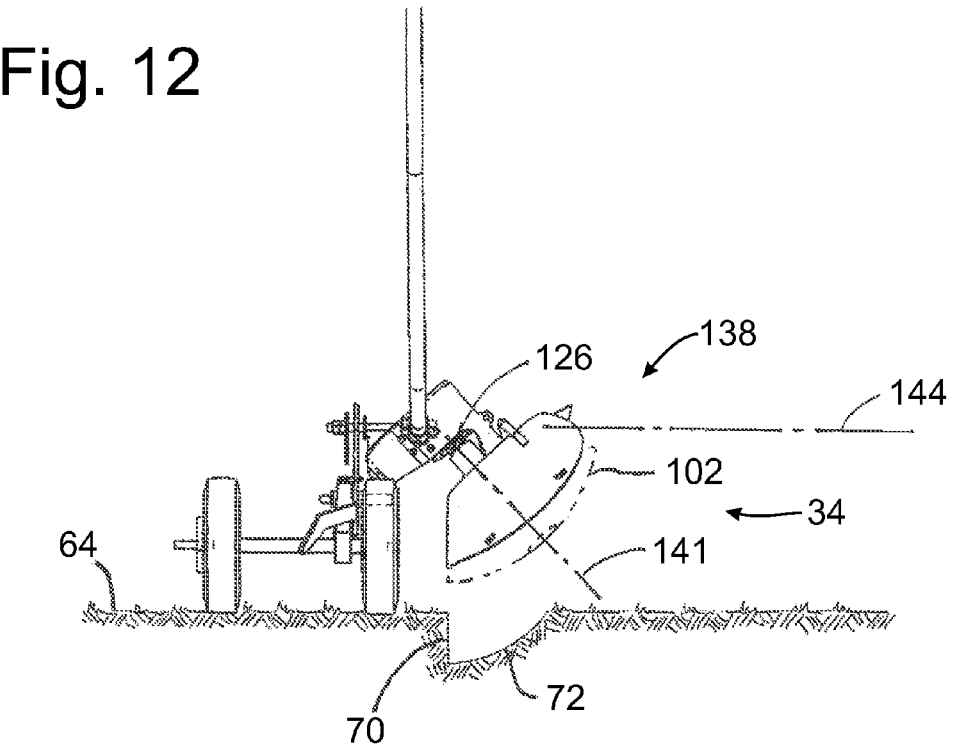
FIG. 12 is a rear elevational view of the second embodiment of the edger apparatus with the rotor assembly in the raised transport position.
Figure 13:
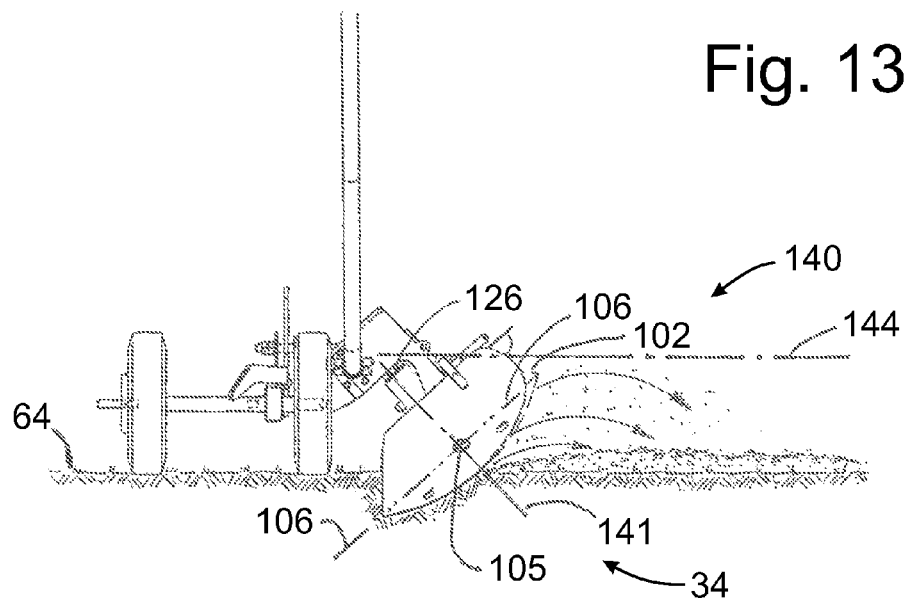
FIG. 13 is a rear elevational view of the second embodiment of the edger apparatus with the rotor assembly lowered into the operative trench forming position.

A second embodiment of the edger 113, which can be referred to as a Stick Bededger, can be seen in FIGS. 11-15. The edger 113 has a different geometry for lowering the terrain slicing rotor 34 from the inactive transport position 138 above the terrain, as shown in FIGS. 12 and 14, to the active terrain trench cutting position 140 located down in the terrain, as shown in FIG. 13, as will be described in greater detail below. The axle pivot drop edger 113 has a main frame assembly 119 pivotally attached to the axle frame assembly 115, which moves in the direction of travel during operation shown by directional arrow 111 in FIG. 15. The main frame assembly 119 can be pivotally advanced controllably into the terrain relative to the axle frame assembly 115.

The axle frame assembly 115 includes an axle frame 125 having a rear axle shaft 123 and a front axle shaft 114 attached thereto. The rear axle shaft 123 has two wheels 121 attached at opposing ends of the rear axle shaft 123, and the front axle shaft 114 has a single wheel 121 attached thereto. A latch 128 is pivotally attached to axle frame 125 at a pivot hub location 130 and has the function of latching the pin 136, which is attached to the main frame assembly 119 to hold the main frame assembly 119 up in the inactive transport position 138, as shown in FIG. 12.

The main frame assembly 119 includes a gearbox 120 attached to pivoting gearbox frame 118, which in turn is pivotally attached to front axle shaft 114. A power unit 117, preferably including a gasoline engine 124 of the type commonly used to power hand-held grass trimmers, is mounted at the proximal end of the main frame assembly and is attached to the gearbox input shaft 122 to supply rotational power to the gearbox 120. The terrain slicing rotor 34 is connected to the gearbox output shaft 126 of the gearbox 120. The main frame assembly 119 is supported at the power unit 117 by the edger operator who can manually pivot the main frame assembly 119 between the raised transport position 138 and the lowered trench cutting position 140.

The main frame assembly 119 can latch up in the inactive raised transport position 138 by raising the main frame assembly 119 upwardly to be automatically latched by pivoting latch 128 connecting to a pin 136 attached to gearbox frame 118, best seen in FIG. 14. The pivoting latch 128 is biased forwardly into a latch position by the spring 127 which extends between the pivot latch 128 and the axle frame 109. To unlatch and lower main frame 119, the operator steps on the rear tread portion 134 of latch 128 to pivot the latch 128 away from pin 136, allowing the main frame 119 to be lowered to the operative trench cutting position, as shown in FIG. 15.

The terrain slicing rotor 34 operatively connected to the gearbox 120 is angled down from horizontal gearbox centerline 144 so that when it is at full cutting depth the terrain slicing rotor 34 is positioned with intersection point 105 on or above the top surface of terrain 64 at location 105. As noted above with respect to the first embodiment of the edger 10, if terrain slicing rotor 34 is positioned with the intersection point 105 below the top surface of terrain 64, the rotary cutting forces of the terrain slicing rotor 34 engaging with the terrain start to steer the machine 113 more to the side instead of straight ahead. The terrain slicing rotor 34 of the axle pivot drop edger 113 is exactly the same assembly and has substantially the same operative function as the first embodiment of the edger 10 described above in conjunction with FIGS. 5-7 except that the trench is not formed with a "curved shape" slanted wall 72 created when raising the terrain slicing rotor 34 out of the terrain 64. The pivot geometry of the axle pivot drop edger 113 allows for the formation of a straight slanted wall which lessens the amount of soil being cut by the rotor 34 and the power required to do so.

Operation Description

To operate the gearbox pivot drop edger 10 (also referred to as the Walk-behind Bededger), the engine 14 is started to provide operative power to the terrain slicing rotor 34 to dig a vertical face 70 and sloped face 72 trench as shown in FIG. 3. To start rotation of the terrain slicing rotor 34, the operator depresses clutch handle 78 by pivoting the handle 78 toward the handlebar 88, as shown in FIG. 3, which then lowers the idler 86 into engagement with the v-belt 18, placing tension on the v-belt 18 to allow the power take-off sheave 16 of the rotating engine 14 to transfer rotational power from the engine power take-off shaft 17 to the gearbox 21 and, thereby, rotate the terrain slicing rotor 34. At the start of operation of the edger 10, the trench cleaning plate 60 is positioned on top of the ground behind the rotor 34.

The operator then pivots the control panel 40 clockwise, as shown in FIG. 3, to move into the trench edging operating position which lowers the terrain slicing rotor 34 into engagement with the terrain 64. The operator then, with assistance from rotation of the terrain slicing rotor 34, pushes the gearbox drop edger 10 forward along a desired path of travel to form a spatial extent of a trench. As the rotor 34 is forming the beginning of the trench, the slicing blades 90, 94 engage into the ground discharging the displaced soil outwardly onto the landscape bed. As the edger 10 advances forwardly, the trench cleaning blade 60 moves into the formed trench due to the biasing force exerted by the spring 61a until the trench cleaning plate 60 is fully inserted into the trench to deflect the displaced soil out of the trench as the edger 10 progresses forwardly.

Trench depth into the terrain 64 is controlled by either adjusting the length of link 48 between the pivot arm 46 and the gearbox extension arm 50 or by adjusting the height of the caster wheel 30 and the fixed wheel 26 using depth control mechanisms rear 38 and front 36. Adjusting the amount of distance that the flexible soil deflection flap 62 hangs out over rotor shield assembly 58 regulates the distance and thickness the soil is discharged from terrain slicing rotor 34. Soil displacement can be adjusted from a wide thin layer spread pattern that's thrown out into the landscape bed 69 to a narrow, but much thicker soil mound that's positioned alongside the formed trench.

To operate the axle pivot drop edger 113 (also referred to as the Stick Bededger), the engine 124 located on power unit 117 is started. To provide operative power to the terrain slicing rotor 34, the operator depresses the clutch handle 148 located on power unit 117 to engage the drive and transfer rotational power to the gearbox 120 for rotation of the terrain slicing rotor 34. The operator then steps on rear tread portion 134 of the latch 128, best seen in FIG. 14, to unlatch the main frame assembly 119 from being held up by the axle frame 115 on the pin 136 and lower the main frame assembly 119 with the terrain slicing rotor 34 into the operating position. The rotor 34 can then form a trench in the terrain 64 with a vertical face 70 and a sloped face 72, as depicted in FIGS. 13 and 15. The operator then, with assistance from the rotation of the terrain slicing rotor 34, pushes the axle pivot drop edger 113 forwardly along a desired path of travel and form a spatial extent of a trench.

To successfully achieve forward operating advancement without the use of a self propelled transmission that controllably drives the apparatus 10, 113 forwardly, several key functional elements are needed to prevent the apparatus from hopping upwardly, jumping forwardly or steering off to the side instead of going the direction the operator desires when steering the apparatus to cut the desired trench outline surrounding the bed 69. Forward operation key functional elements start with the terrain slicing rotor 34. The direction of the blade rotational, which has the leading edge of the first slicing blade moving into engagement with the terrain 64, helps to assist the operator in pushing the apparatus forwardly.

To accomplish this and achieve maximum operator control of the forward movement and travel direction of the apparatus 10, 113, the terrain slicing rotor 34 has a 360 degree cone shaped cutting pattern 102 that rotates counter clockwise shown by arrow 103 in FIG. 5, when viewing out from the center of the machine toward the distal end of the rotor 34. The cone shaped cutting pattern 102 of the terrain slicing rotor 34 has the smaller diameter cone end positioned closer to gearbox 126 and the larger diameter cone end positioned further away from gearbox 126, so when the terrain slicing rotor 34 is at full cutting depth the terrain slicing rotor 34 is positioned with intersection point 105 on or above the top surface of terrain 64. If the terrain slicing rotor 34 is positioned with intersection point 105 below the top surface of terrain 64, the rotary cutting forces of the terrain slicing rotor 34 with terrain 64 start to steer the machine more to the side instead of straight ahead.

Another forward operation key functional element of the terrain slicing rotor 34 is the thin sloped, or tapered, slicing blades. The terrain slicing rotor 34 has a first thin slicing blade 90 for forming the vertical wall of the trench with the sloped slicing cutting edge 92, and a second slicing blade 94 for forming the slanted wall of the trench with the sloped slicing cutting edge 96. Both the first and second slicing blades 90, 94 are mounted on the rotor shaft 98 for rotation therewith.

The thin sloped shape of these slicing blades 90, 94 easily slice and penetrate into the terrain 64 minimizing the opposing negative recoil reaction of hopping, jumping forward or steering off to the side when cutting into hard tough soil conditions or obstructions in the terrain 64, such as large rocks or tree roots which have the potential of creating unsafe conditions for the operator. Basically, the sloped slicing cutting edge 92 of the first slicing blade 90 slices through most all soil conditions, but when the first slicing blade 90 comes in contact with obstructions in the terrain 64, such as large rocks or tree roots, the blade 90 gently slides up and over the obstructions without grabbing or getting caught and, thereby, causing the apparatus to start bucking and jumping forward or steering off to the side.

Another forward operating advancement key functional element of the terrain slicing rotor 34 is the cutting characteristic of the thin trench vertical wall slicing blade 90 with the sloped slicing cutting edge 92 is so efficient in cutting the trench that less weight is required to hold the apparatus on the ground during operation. This in turn allows the apparatus to be lighter in weight then other comparable known bededgers and easier for the operator to push. Further, the direction of rotation of the slicing blades 90, 94 advances the cutting edge 92 forwardly into the terrain which pulls the edger 10, 113 in the forward direction of movement in the formation of the trench, as opposed to conventional edging machines that have to be pulled rearwardly forcing the operator to look rearwardly in order to walk, while being required to look forwardly to observe the machine cutting the edging trench.

The depth at which the trench is formed into terrain 64 is controlled by the operator rotating and then locking the depth control plate 150 on the pin 136 to a desired depth controlling position. The eccentric shape of depth control plate 150 allows for different distance adjustments extending out from pin 136. So when main frame assembly 119 with the depth control plate 150 attached is unlatched from latch 134 and lowered onto the axle frame 125, the rotary position of the depth control plate 150 positions the main frame assembly 119 relative to axle frame 115 to cut the desired trench depth into the terrain 64. The trench cleaning plate 60 guides the cut soil out of the trench, delivering the displaced soil to the bed 69 and keeping the trench clean after cutting the trench. The cut geometry of the terrain slicing rotor 34 softly throws the soil directly out of the trench and onto the landscape bed 69 automatically spreading the displaced soil over the surface of the bed 69.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A landscape trench forming apparatus, comprising:
a frame movable in a direction of travel to form a landscape trench;
an engine supported on said frame to provide a source of rotational power;
a trench-forming rotor operably connected to said engine to receive rotational power therefrom, said rotor having a leading edge relative to the engagement of the ground in said direction of travel and being operable upon rotation to dig a trench into the ground, said rotor being driven by said engine for rotation in a direction that has the leading edge of said rotor moving from above the ground into engagement with the ground such that the rotation of said rotor assists in moving the apparatus in said direction of travel; and
a deflector structure supported by said frame in cooperative relationship to said rotor such that displaced soil removed from the ground to form said trench is deflected outwardly away from said rotor, said deflector structure including a trench cleaning blade formed in a shape corresponding to a cutting profile of said rotor and positioned rearwardly of said rotor with respect to said direction of travel and within said trench to prevent displaced soil from being discharged from said rotor into said formed trench, said trench cleaning blade being mounted to permit limited multi-directional movement that allows said trench cleaning blade to move relative to said trench-forming rotor and to float within said trench rearwardly of said rotor and follow changes in vertical depth of said trench.

2. The trench forming apparatus of claim 1 wherein said rotor is positioned on a right side of said frame, said rotor being rotated in a counter clockwise direction when viewed from a central portion of said apparatus and looking toward a distal end of said rotor such that said leading edge of said rotor is at a front portion of said rotor so that the rotation of said rotor assists in moving the apparatus in a forward direction.

3. The trench forming apparatus of claim 2 wherein said rotor includes a first slicing blade mounted corresponding to a proximal end of said rotor and a second slicing blade corresponding to a distal end of said rotor said first slicing blade forming a substantially vertical wall portion of said trench, said second slicing blade forming a slanted wall portion of said trench.

4. The trench forming apparatus of claim 3 wherein said rotor is pivotally supported from said frame and movable between a raised inoperative position and a lowered operative position in which an axis of rotation of said rotor is angled such that said distal end of said rotor is lower than said proximal end of said rotor.

5. The trench forming apparatus of claim 4 wherein the rotation of said rotor generates a conical cutting configuration with a smaller diameter of said conical cutting configuration located at said proximal end of said rotor and a larger diameter of said conical cutting configuration located at said distal end of said rotor.

6. The trench forming apparatus of claim 5 further comprising a gearbox supported on said frame and having an input shaft and an output shaft, said engine being operatively coupled to said gearbox by a drive transfer mechanism so that said engine transfers rotational power to said gearbox, said rotor being detachably connected to said gearbox output shaft.

7. The trench forming apparatus of claim 6 wherein said gearbox is pivotally supported on said frame for pivotal movement about a pivot axis corresponding to said input shaft, the pivotal movement of said gearbox being operable to move said trench-forming rotor between a raised inoperative position and a lowered trench-forming operative position.

8. The trench forming apparatus of claim 7 further comprising:
a pivot control mechanism including a linkage for moving said rotor between said raised and lowered positions; and
a depth control mechanism to limit the depth to which said rotor can engage into the ground.

9. The trench forming apparatus of claim 6 wherein said frame is supported for movement by at least two wheels supported respectively on at least two wheel axles, said gearbox being pivotally supported on said frame for pivotal movement about a pivot axis corresponding to one of said wheel axles, the pivotal movement of said gearbox being operable to move said trench-forming rotor between a raised inoperative position and a lowered trench-forming operative position.

10. The trench forming apparatus of claim 9 wherein said frame includes an elongated stick, said engine being mounted on a proximal end of said elongated stick with said drive transfer mechanism passing through an interior portion of said elongated stick to connect to said input shaft of said gearbox.

11. A landscape trench forming apparatus, comprising:
a frame supported for movement over the ground by at least two wheels;
an engine supported on said frame to provide a source of rotational power; and
a trench-forming rotor operatively connected to said engine to power a rotation of said trench-forming rotor in order to form a trench in the ground, said rotor including a first slicing blade mounted on a proximal end of said rotor and a second slicing blade mounted on a distal end of said rotor, the rotation of said rotor generating a conical cutting configuration with a smaller diameter of said conical cutting configuration located at said proximal end of said rotor and a larger diameter of said conical cutting configuration located at said distal end of said rotor, said first slicing blade being formed with a first cutting edge that when engaged into the ground forms a substantially vertical wall portion of said trench, said first cutting edge having a tapered configuration such that said cutting edge increases depth into the ground upon rotation until a maximum depth has been reached.

12. The trench forming apparatus of claim 11 wherein said second slicing blade being formed with a second cutting edge that when engaged with the ground forms a slanted wall portion of said trench, said second cutting edge also having a tapered configuration such that said second cutting edge increases depth into the ground upon rotation until a maximum depth has been reached, said first and second cutting edges being dispose diametrically opposite one another so that said first and second cutting edges engage the ground sequentially.

13. The trench forming apparatus of claim 12 wherein said rotor has a leading edge formed by said first cutting edge and corresponding to a front portion of said apparatus, said trench-forming rotor being driven by said engine for rotation in a direction that has the leading edge of said rotor moving from above the ground into engagement with the ground so that the rotation of said rotor assists in moving the apparatus in a forward direction to form said trench.

14. The trench forming apparatus of claim 13 further comprising a deflector structure supported on said frame and including a trench cleaning blade positioned rearwardly of said rotor to direct soil displaced from said rotor away from the formed trench, said trench cleaning blade being mounted for floating movement relative to said rotor to allow said trench cleaning blade to remain positioned within the formed trench.

15. The trench forming apparatus of claim 12 further comprising a gearbox supported on said frame and having an input shaft and an output shaft, said engine being operatively coupled to said gearbox by a drive transfer mechanism so that said engine transfers rotational power to said gearbox, said gearbox being pivotally supported on said frame to move said trench-forming rotor between a raised inoperative position and a lowered trench-forming operative position, said distal end of said rotor being lower than said proximal end of said rotor when in said operative position.

16. A landscape trench forming apparatus, comprising:
a frame supported for movement over the ground a direction of travel;
an engine supported on said frame to provide a source of rotational power; and
a trench-forming rotor operably connected to said engine to receive rotational power therefrom, said rotor having a leading edge engaging the ground from above with respect to said direction of travel and being operable upon rotation to dig a trench into the ground, said rotor being driven by said engine for rotation in a direction that has a leading edge of said rotor moving from above the ground into engagement with the ground such that the rotation of said rotor assists in moving the apparatus in said direction of travel, said rotor including:
a first slicing blade mounted on a proximal end of said rotor, said first slicing blade being formed with a first tapered cutting edge that when engaged into the ground forms a substantially vertical wall portion of said trench; and
a second slicing blade mounted on a distal end of said rotor, the rotation of said rotor generating a conical cutting configuration with a smaller diameter of said conical cutting configuration located at said proximal end of said rotor and a larger diameter of said conical cutting configuration located at said distal end of said rotor, said second slicing blade being formed with a second tapered cutting edge that when engaged with the ground forms a slanted wall portion of said trench, said first and second cutting edges being positioned diametrically opposite one another to engage the ground sequentially during operation of said rotor, said first and second cutting edges being operable to progressively increase depth of engagement into the ground when said rotor is operated.

17. The trench forming apparatus of claim 16 further comprising a gearbox supported on said frame and having an input shaft and an output shaft, said engine being operatively coupled to said gearbox by a drive transfer mechanism so that said engine transfers rotational power to said gearbox, said gearbox being pivotally supported on said frame for pivotal movement about a pivot axis to move said trench-forming rotor between a raised inoperative position and a lowered trench-forming operative position, said trench-forming rotor being oriented at an angle to the ground when in said lowered trench-forming operative position such that said distal end of said rotor is lower than said proximal end of said rotor, said distal end being positioned at approximately the level of the surface of the ground when in said trench-forming operative position.

18. The trench forming apparatus of claim 16 wherein said rotor is positioned on a right side of said frame, said rotor being rotated in a counter clockwise direction when viewed from a central portion of said apparatus and looking toward a distal end of said rotor such that said leading edge of said rotor is at a front portion of said rotor whereby the engagement of said leading edge of said rotor with the ground assists in moving the apparatus in a forward direction.

19. The trench forming apparatus of claim 16 further comprising a trench cleaning blade formed in a shape corresponding to a cutting profile of said rotor and positioned rearwardly of said rotor with respect to said direction of travel and within said trench to prevent displaced soil from being discharged from said rotor into said formed trench, said trench cleaning blade being mounted to permit limited multi-directional movement that allows said trench cleaning blade to float within said trench rearwardly of said rotor and follow changes in vertical depth of said trench.

* * * * *